United States Patent [19]

Morinaga et al.

[11] Patent Number: 4,584,963
[45] Date of Patent: Apr. 29, 1986

[54] SYSTEM FOR REPAIRING JOINTS IN PIPES LAID UNDERGROUND

[75] Inventors: Akio Morinaga, Fujisawa; Mitsutoshi Hayashi, Tokyo; Motoyuki Koga, Tokyo, all of Japan

[73] Assignees: Tokyo Gas Co., Ltd.; Hakko Co., Ltd., both of Tokyo, Japan

[21] Appl. No.: 685,284

[22] Filed: Dec. 24, 1984

[30] Foreign Application Priority Data

Dec. 28, 1983 [JP] Japan ................................ 58-246621

[51] Int. Cl.⁴ ...................... B05C 11/00; B05C 11/02; B05C 1/00
[52] U.S. Cl. .................................... 118/663; 118/105; 118/215
[58] Field of Search ........................ 118/105, 215, 663

[56] References Cited

U.S. PATENT DOCUMENTS 3,394,025 7/1968 McCune .......................... 118/105 X
3,753,766 8/1973 Brown et al. .................... 427/142 X

Primary Examiner—James R. Hoffman
Attorney, Agent, or Firm—Martin A. Farber

[57] ABSTRACT

A system for repairing joints in pipes laid underground, such as gas pipes, in their buried state, from their inside, to ensure their sealing.

The system, in the process of pushing the resin used for repairing along the inside of the pipes by the pig, is to fill and seal the sealing material with the resin through gaps in numerous pipe joints inside of the pipes. In order to guarantee insertion of resin into gaps in the pipe joints (sealing material) whether or not the pipe joint has developed a leak, the system comprises a substitution pig, and a means whereby the pig pushes the resin placed ahead of it along the pipe, and further, a means whereby the filling amount of the resin does not change even if the amount of resin present in front of the pig differs between the early and later stages of the repairing operation, gaps in the pipe joints will be uniformly filled.

5 Claims, 9 Drawing Figures

SYSTEM FOR REPAIRING JOINTS IN PIPES LAID UNDERGROUND

BACKGROUND OF THE INVENTION

This invention relates mainly to a system for repairing joints in pipes laid underground, such as gas pipes, in their buried state, from their inside, to ensure their sealing.

In pipes laid underground such as gas mains, which consist of lengths of cast iron tubes joined together by pipe joints of the water mains type, the pipe joints are known to become sources of leaks due to changes in mating conditions and hence formation of gaps in the joints caused by the weight of vehicles passing over the pipe, by earthquakes or by aging, or due to deterioration of materials comprising the joints. In order to repair such leaks, and for preventive maintenance against such leaks, it has been proposed in recent years to repair the pipe joints from their inside while the pipe is left underground.

As one form of such repairing systems, a repairing system for joints in pipes laid underground has been proposed, in which the pipe is divided into sections of certain lengths and a pig which is slidable along the inside of the pipe while maintaining sealage at its periphery in contact with the pipe inside is inserted into the section of pipe to be repaired from one of its open ends, with a certain amount of resin supplied in front of the pig. The pig is drawn towards the other open end by a tow cable, filling gaps in pipe joints along the pipe section one after another with resin in the process.

Under the above-mentioned repairing system, it is imperative that care is taken to ensure the entry of resin into gaps in the pipe joints, so that the resin infiltrates and saturates the packing material, if it is to achieve a high sealing effect. Although the resin is able to enter the packing material with relative ease in the case of joints which have developed leaks to achieve a good sealing effect, for pipe joints with no leak, the entry of resin is inhibited by residual air among the packing material. As there are many pipe joints at certain pitch intervals along the pipe, among which those with and without leaks coexist, there remains the problem of the effectiveness of repairing being uneven.

Also under the above-mentioned repairing system, although in the early stages of the repairing operation when there is a large amount of resin ahead of the pig, the viscous drag between the resin and the pipe inside causes a high pressure in the resin which in turn ensures substitution and saturation of gaps in pipe joints with resin, as the amount of resin ahead of the pig diminishes with the progress of the filling process, a decline of pressure in the resin due to viscous drag between the resin and the pipe wall occurs, leading to a drop in filling pressure, the problem of the substitution and saturation process becoming unreliable arising in the later stages of the repairing operation.

This invention seeks to provide an improved repairing system for pipe joints, under which problems such as those mentioned above are avoided.

SUMMARY OF THE INVENTION

The object of the present invention is to provide a system for repairing joints in pipes laid underground. In order to meet the objectives of the invention, the invention is characterized by the provision of an air supply means to exert the required frontal air pressure on the resin in the pipe ahead of the moving pig, and by the provision of axially extending escape and filling channels opening on the periphery of the pig, the openings of the two types of channels being separated along the circumference of the pig so that they do not connect with each other directly, while their ends overlap each other in the axial direction. The escape channel is connected to an opening on the rear face of the pig while the filling channel extends forward to the front face of the pig. When the pig passes a pipe joint, resin is forced through the filling channels into gaps in the pipe joint by frontal air pressure exerted on the resin and by resin pressure due to viscous drag caused by the movement of the resin itself, residual substances such as air among the packing and gaps in the pipe joint being expelled through the escape channels to the rear of the pig, enabling resin to infiltrate and saturate the packing.

Another object of the invention is to enable a uniform filling of gaps in the pipe joints with resin along the length of the section to be repaired. In order to meet the object, the towing speed of the pig is controlled in such a way that the pig is towed at a higher speed in the early stages of the repairing operation when there is a large amount of resin ahead of the pig causing a high resin pressure due to viscous drag between the resin and the pipe inside, and the towing speed of the pig is reduced in the later stages of the repairing operation in accordance with the decline in resin pressure due to the diminishing amount of resin ahead of the pig.

Both the frontal air pressure and towing speed are controlled in such a way that a lower frontal air pressure is exerted and the pig is towed at a higher speed in the early stages of the repairing process when there is a large amount of resin ahead of the pig giving rise to a high resin pressure due to viscous drag between the resin and the pipe inside, and the frontal air pressure is increased and the towing speed of pig is reduced in the later stages of the repairing process, in accordance with the decline in resin pressure due to the diminishing amount of resin ahead of the pig.

Two pigs, namely the first pig and the second pig are drawn through the pipe in succession, the second pig being provided with the escape and filling channels while the first pig serves to clean and prepare the inner surface of the pipe prior to repairing.

The two pigs are drawn through the pipe by a tow cable wound by a winch, the first pig being detachably connected to the tow cable with the tow cable penetrating it through its axis so that the first pig may be selectively fixed or released in relation to the tow cable, thus enabling the first pig to be freed from the tow cable while drawing the second pig out of the pipe when extracting the two pigs from the end of the pipe section.

The second pig is built up from several component sections, including the body leading section and the main body section, these components being composed of flexible rubber material, and a connection plate fixed to the tow cable buried in between the nose and main body sections. A supporting disc provided at the head end of the nose section is connected to the connection plate by bolts and nuts to clamp the nose section between the two plates, while a supporting plate at the tail end of the main body section is connected to the connection plate by tension wires to inhibit elongation of the main body section.

In another embodiment, the second, or substitution pig is built up of several component sections including the body leading section and main body section, combined to form a cylindrical body with a connection plate fixed to the tow cable provided in between the two said sections. At least the outer portion of the main body section is composed of soft material while the core portion is composed of hard material, the pig being fixed to the tow cable at its tail end as well.

The second pig has a nose section in the form of a tapered cone, and the rear end of the escape channel opening is provided with a tapered surface sloping towards the rear and outward of the pig.

The axial length of the channel openings on the outer periphery of the pig is longer for the escape channels than for the filling channels.

The escape channels are provided with a form keeping component to prevent distortion of the channel under deformation of the pig.

After the repairing or filling process is completed, the resin which has entered the entrance to the distribution pipes branching off from the main pipe is purged from the distribution pipes into the main pipe in a purging process by introducing pressurized air into the distribution pipes, and then is smoothed over the inner wall of the main pipe by drawing a leveling pig through the pipe.

The other objects and features of this invention will be apparently understood from the following description with reference to the accompanying drawings.

BRIEF DESCRIPTION OF THE DRAWINGS

FIG. 6 is a perspective view of the second pig, while

DETAILED DESCRIPTION OF THE PREFERRED EMBODIMENT

Figure 1:
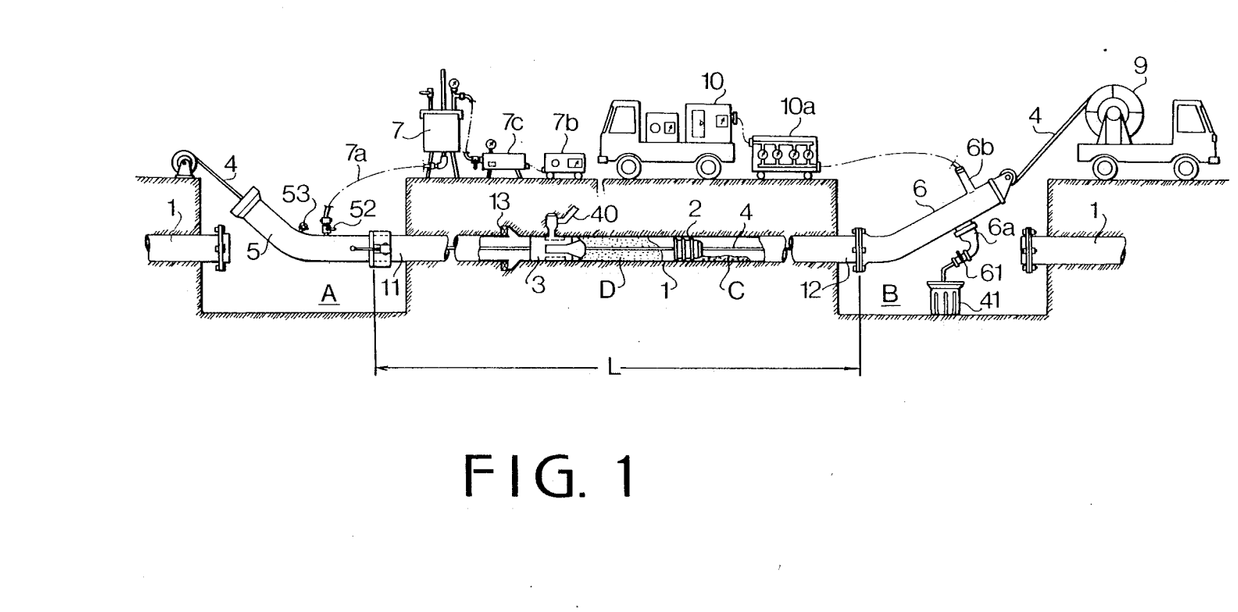
FIG. 1 is an overall view of an embodiment of this invention shown in schematic form.

Referring to FIG. 1 which shows the entire repairing apparatus in schematic form, the underground pipe to be repaired is indicated by reference number 1, and consists of cast iron tubes of certain lengths joined together by pipe joints 13 of the water mains type to form a long pipe, laid by conventional methods. According to this invention, to repair the pipe joints 13 along the underground pipe 1, the pipe is divided into sections of certain lengths (100 meters, for example) suitable for the repairing operation, exposing one of its separated ends 11 in a pit A opening on the surface, and the other separated end 12 in a pit B also opening on the surface. On each of the separated ends 11, 12 are connected an inlet guide tube 5 and an outlet guide tube 6, for the introduction or extraction of pigs respectively. A tow cable 4 is inserted through the inlet guide tube 5 on one end of the pipe section 1, to be passed through the pipe section and led out from the outlet guide tube 6 at the other end. By winding the end of the tow cable 4 in with a winch 9, a pair of longitudinally spaced apart pigs 2, 3 are introduced into the pipe 1 and drawn from the inlet to the outlet, with low viscosity resin C and joint sealing resin D, respectively placed ahead of the first and second pigs 2, 3.

Figure 5:
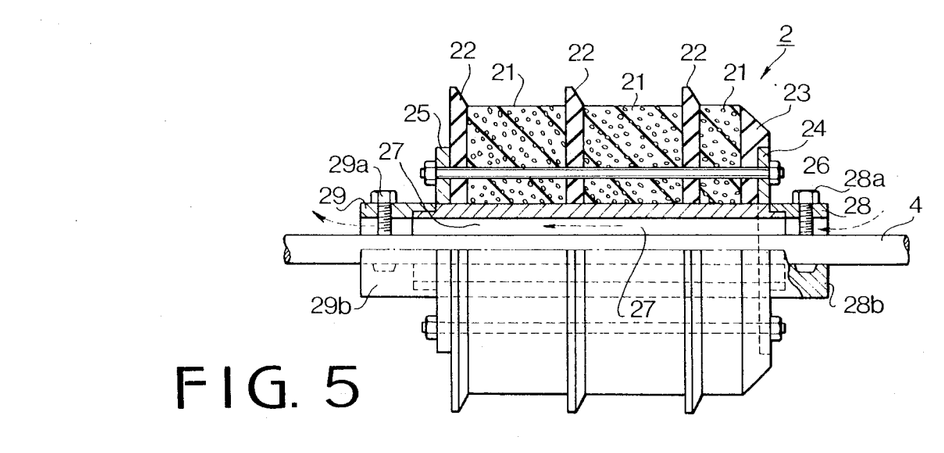
FIG. 5 is a semi-cross sectional side view of the first pig.

As shown in cross-section in a larger scale in FIG. 5, the first pig 2 is built up of several cylindrical body sections 21 composed of soft flexible material (hard neoprene sponge of stiffness about 50, for example) and several disc-like fins 22 composed of hard flexible material (neoprene rubber of stiffness about 60, for example) stacked together alternately, with a nose section 23 of truncated conical shape composed of the same hard flexible material as mentioned above, and metal supporting discs 24, 25 on the head and tail ends. The body sections 21, fins 22 and nose section 23 are fastened together in tandem fashion by stud bolts 26 penetrating the length of the pig between the two supporting discs 24, 25, the stud bolts 26 also serving to inhibit elongation of component sections. The first pig 2 is provided along its center line with a hollow shaft 27 through which the tow cable 4 is passed, the first pig and the tow cable 4 being connected by clamping collars 28, 29 on the head and tail ends of the pig. The clamping collars 28, 29 clamp the tow cable 4 between bolts 28a, 29a and seats 28b, 29b provided on the collars in opposing manner. These clamping collars 28, 29 are preferably located on the ends of a flexible pipe inserted in the hollow shaft 27. Besides providing a passage for the tow cable 4, this flexible pipe also serves to transmit air pressure from front to rear of the first pig 2. The passage for transmission of air pressure, however, may be provided separately from that for the tow cable 4.

Figure 6:
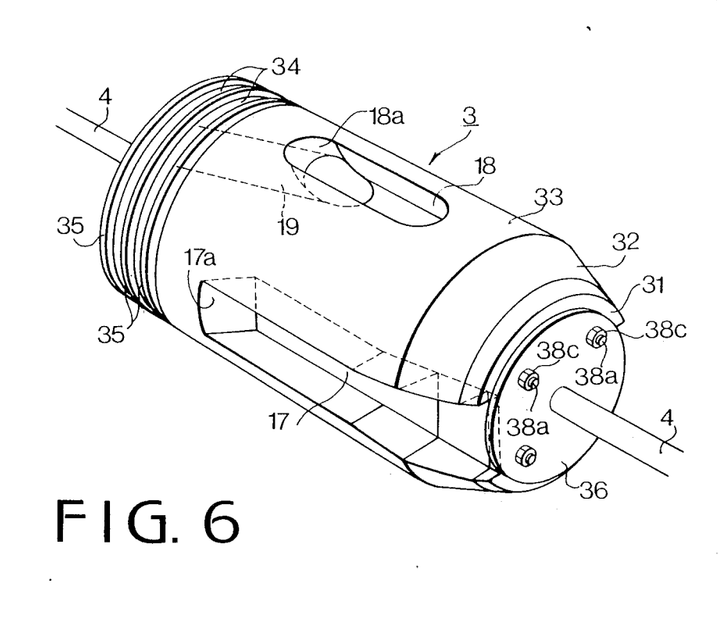
Figure 7:
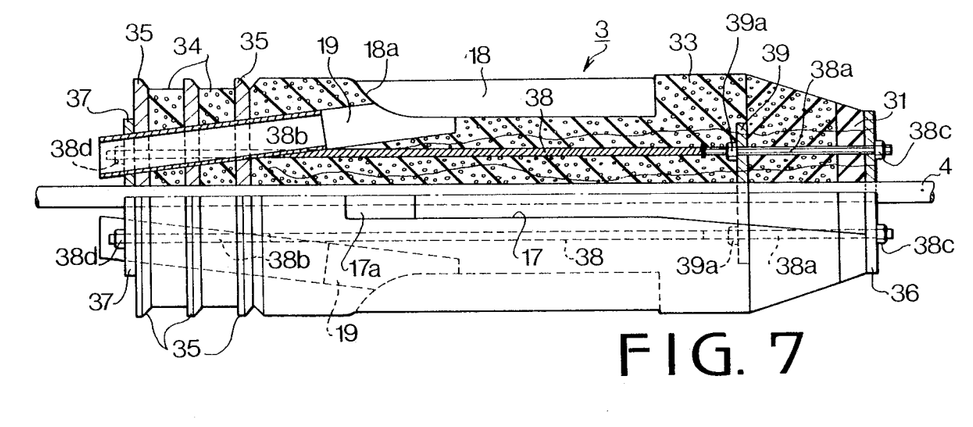
FIGS. 7 and 8 are respectively a semi-cross sectional side view and a front view of the second pig.
Figure 8:
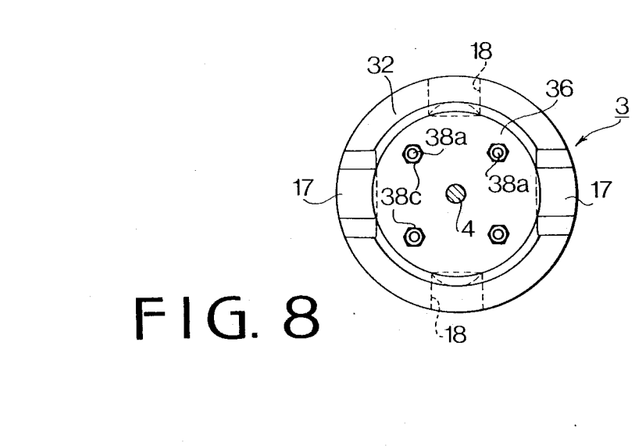

As shown in larger scale in FIGS. 6, 7 and 8, the second pig is built up from a nose section 31 of truncated conical shape at the front end, composed of hard flexible material (neoprene rubber of stiffness about 60, for example), a body leading section 32 of truncated conical shape immediately following the nose section 31, composed of soft flexible material (hard neoprene sponge of stiffness about 50, for example) and a cylindrical body section 33 following the body leading section 32, composed of the same soft flexible material, followed by cylindrical rear body sections 34 of the same soft flexible material and disc-like fins 35 of the same hard flexible material stacked alternately in tandem fashion. All components are retained between supporting discs 36, 37 at the head and tail ends of the second pig 3 by wires 38 provided with threads 38a, 38b at both ends, and nuts 38c, 38d. A connection plate 39 fixed to the tow cable 4 is buried in the pig 3 between the body leading section 32 and body section 33, and is fixed to the wires 38 at threads 38a by nuts 39a. The threads 38a maintain the distance between the connection plate and the supporting disc 36, preventing excessive deformation of the nose and body leading sections 31, 32 by compression, while the wires 38 provide tension in the mid portion of pig to inhibit elongation of the main body section 33 while moving through the pipe under towage. The flexibility of the body section is, however, maintained, reducing resistance at bends in pipe 1 despite the great length of the pig compared to its diameter.

In order to fulfill the resin filling requirements, the second pig 3 is provided on its outer periphery with filling channels 17 opening onto the front face of the pig on the left and right sides, and with escape channels 18 parallel to the filling channels on the top and bottom. The filling and escape channels 17, 18 both have rear end walls 17a, 18a tapered rearwardly and outwardly, and the escape channels 18 are made to open onto the rear face of the pig via passages 19 in form-keeping polyethylene tubes buried within the pig.

Figure 2:
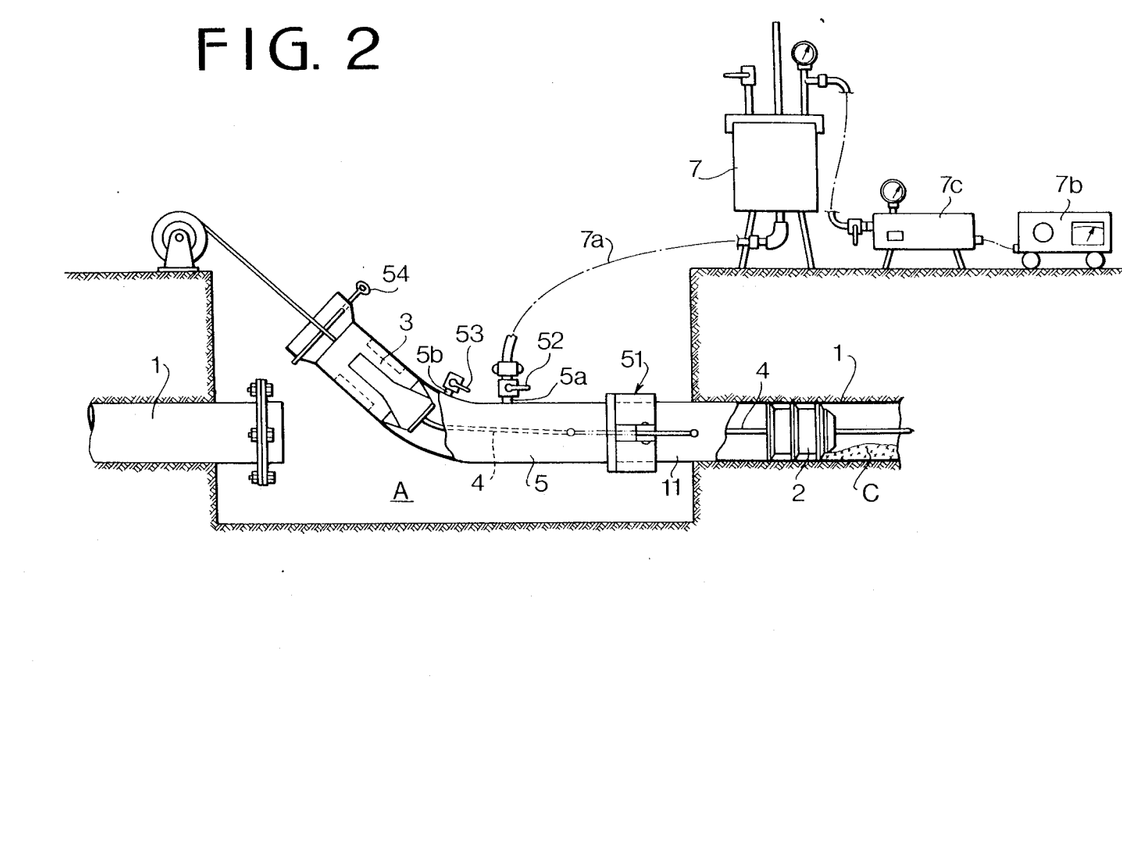
FIG. 2 is a side view of the inlet guide tube for the insertion of pigs shown in schematic form.
Figure 3:
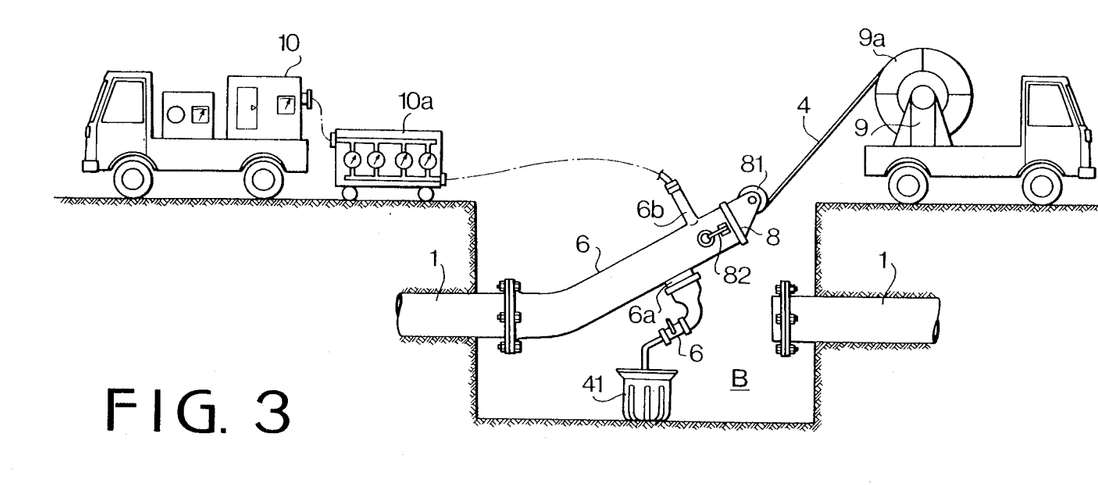
FIG. 3 is a side view of the outlet guide tube for the extraction of pigs shown in schematic form.
Figure 4:
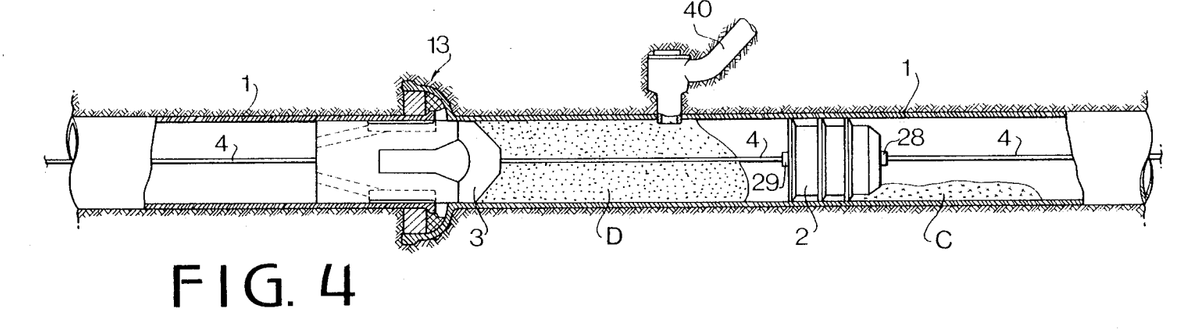
FIG. 4 is a cross sectional side view of the pigs being drawn along the pipe.
Figure 9:
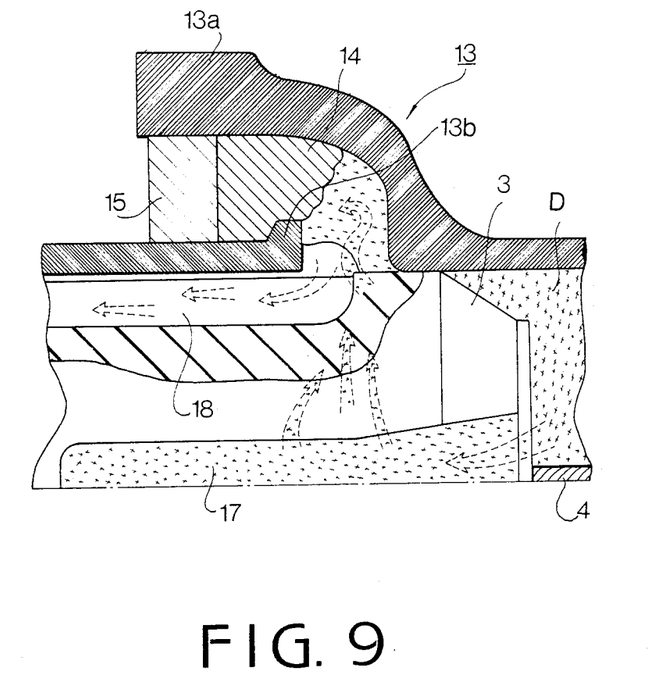
FIG. 9 is an enlarged cross sectional side view of a pipe joint showing the filling of the joint with resin.

FIGS. 2, 3 of such construction, are introduced into the pipe 1 and drawn through with low viscosity resin C and joint sealing resin D placed in front of the first and second pigs respectively, repairing pipe joints 13 along the pipe in the process. The pipe joint 13 to be repaired, shown in FIG. 9 for example, consists of an end 13b of one pipe inserted into an enlarged end 13a of another pipe, with packing material 14 such as jute packing stuffed around the joint and sealed with lead 15.

As has been mentioned, an inlet guide tube 5 for the introduction of pigs, and an outlet guide tube 6 for the extraction of pigs, are connected to each separated end of pipe 1. The guide tubes 5, 6 are shown in FIGS. 2 and 3 in larger scale.

The inlet guide tube 5, shown in FIG. 2, is connected to the opening on one separated end 11 of pipe 1 by clamps 51. A resin charging port 5a with valve 52 is provided on the inlet guide tube 5, and an exhaust port 5b with valve 53 is provided on a higher location. The said resin charging port 5a is connected by hose 7a to a resin charging tank 7 which is pressurized by a small compressor powered by generator 7b.

On the outlet guide tube 6, as shown in FIG. 3, there are provided a resin discharging port 6a with valve 61 for removal of left over resin, and an air pressurization port 6b on a higher location. The air pressurization port 6b is connected to compressor 10 via a pressure control unit 10a. A lid 8 equipped with a guide reel 81 for guiding the tow cable 4 passing through the pipe, is fitted onto the open end of the outlet guide tube 6 with clamps 82, the said lid 8 being split in halves through the point where tow cable 4 exits.

The end of tow cable 4 is wound onto the drum 9a on winch 9, to introduce pigs 2, 3 into the pipe 1 through the inlet guide tube 5. On introducing the pigs, the first pig 2 is first inserted with resin C supplied in front of it. Next, the second pig 3 is inserted into the inlet guide tube 5, and when the gap between the first and second pigs 2 and 3 corresponds to the resin charging port 5a, resin D is poured into the pipe from tank 7 under pressure from compressor 7c. In order to expel air within the gap between pigs 2, 3, valve 53 is opened to allow air to escape through exhaust port 5b. To prevent the second pig 3 from being ejected from the inlet of guide tube 5 under resin charging pressure, a cross pin 54 is inserted across the outer end of inlet guide tube 5. With the gap between the pigs 2 and 3 filled with a sufficient amount of resin D, the tow cable 4 is tugged by the winch 9. Valve 52 is shut when the changing of resin is completed.

As pigs 2, 3 are drawn through the pipe 1 by tow cable 4, resin C placed in front of the first pig 2 removes debris within the pipe 1 and gaps in pipe joints 13 by its own adhesiveness. When pigs 2, 3 are drawn by tow cable 4, the towing force is transmitted from tow cable 4 to the second pig 3 through the connection plate 39, causing compression in the pig between the connection plate 39 and the supporting disc 36 at the head end, thus improving the fit of pig 3 against the inside of pipe 1. Meanwhile, although tension occurs in the pig under towage between the connection plate 39 and the supporting disc 37 at the tail end, as elongation is inhibited by wires 38, the fit between pig 3 and the pipe inside is maintained in satisfactory condition.

When the second pig 3 reaches a pipe joint 13 (refer to FIG. 9), the resin D ahead of the second pig 3 flows into the gap in the pipe joint through filling channels 17 due to filling pressure caused in the resin by viscous drag between the resin and pipe inside, and by frontal air pressure supplied by compressor 10 via air pressurization port 6. At the same time, residual air among joint gap and packing material is expelled to the rear through escape channels 18 under said filling pressure. As an alternative, air may be drawn out of pipe joint 13 through channel 18 by applying negative pressure in the pipe aft of second pig 3.

In the early stages of the repairing operation when there is a large amount of resin ahead of pig 3, as the area of contact between the resin and the inside of the pipe is also large resulting in large viscous drag, the filling pressure in the resin may be more than sufficient to enable the filling process to be completed in a short time, so the speed at which the pig passes a joint may be relatively fast. As the amount of resin diminishes with the progress of the repairing operation filling pipe joints, the area of contact and hence the viscous drag between the resin and the inside of the pipe also diminish, leading to a decline in filling pressure.

Therefore, according to this invention, the towing speed of the tow cable 4 is controlled in such a way that it is kept at a certain constant value during the early stages, and reduced in the later stages when the amount of resin ahead of the pig has diminished. Also in the embodiment described, air pressure from compressor 10 is introduced into pipe 1 ahead of the pigs from air pressurization port 6b via pressure control unit 10a and led through the first pig 2 to be exerted on the resin ahead of the second pig 3 to further compensate for the decrease in viscous drag.

In practice, it is necessary to maintain a filling pressure of 0.4–0.6 kg/cm$^2$ in the resin, and a filling time of at least one minute. Hence, in a pipe section of 100 meters length for example, the frontal air pressure and/or towing speed are controlled in accordance to the change in viscous drag between resin and pipe inside, as follows:

(1) With 100 m–50 m pipe length left, the frontal air pressure is zero and the towing speed of the pig is 2 m/min.,
(2) With 50 m–20 m pipe length left, the frontal air pressure is increased to 0.1 kg/cm$^2$ and towing speed is reduced to 1.5 m/min.,
(3) With 20 m–0 m pipe length left, the frontal air pressure is further increased to 0.2 kg/cm$^2$ and towing speed is further reduced to 1 m/min.

Thus the filling of pipe joints 13 is carried out more or less uniformly with the appropriate amount of resin.

While the towing speed and the frontal air pressure have been controlled in the above example, considerations may also be given to lessening restrictions on towing speeds by the selection of suitable resin viscosity, or to additionally controlling conditions such as differential pressure across the second pig 3, by application of negative pressure behind the pig, for example.

After the second pig 3 has passed, the entrances to distribution pipes 40 are blocked with resin D. The blocking resin may be purged into the main pipe 1 by introducing pressurized air into the distribution pipes 40. The purged resin can be smoothed over the inside of the pipe by drawing a leveling pig through the pipe 1 later on.

When the repairing operation on pipe joints 13 is completed, clamps 82 are released to remove the lid 8 and to separate it into two halves, and the valve 61 is opened to remove resin C ahead of the first pig 2, before extracting the first pig. Bolts 28a, 29a clamping the first pig 2 to the tow cable 4 are loosened to release the clamping collars 28, 29, and to disconnect the first pig from the tow cable, freeing the first pig. By further winding the tow cable 4 in with the winch 9, the second pig alone is drawn out from the outlet guide tube 6 while the first pig 2 remains still. The remaining resin D is removed through the resin discharging port 6a and recovered in container 41.

As the lid 8 is separated into two halves, it can be kept out of the way while extracting the pigs 2, 3 even when the tow cable 4 is being wound in by the winch.

The repairing system of this invention described above, has the following merits.

On repairing pipe joints by shifting resin with a pig through a pipe section to be repaired, as resin is forced into gaps in pipe joints through filling channels provided on the periphery of the pig by both the frontal air pressure exerted on the resin and the pressure in the resin caused by the movement of the resin itself, the introduction of resin into pipe joints can be made properly. Especially, in this case, as substances to be displaced, such as air among packing material and gaps are purged to the rear of the pig through escape channels on the periphery of the pig, infiltration of pipe joints by resin is not inhibited thus ensuring certain infiltration and saturation of packing material in pipe joints with resin, whether or not each pipe joint has developed a leak, guaranteeing the sealing effect.

Also, by controlling the towing speed of the pig in accordance with the decline in the amount of resin ahead of the pig in later stages of the repairing operation, the unreliability in filling action of resin in pipe joints due to diminished amount of resin (decrease in resin pressure) is avoided, thus enabling a uniform and proper filling action to take place throughout the pipe section.

Further, by also controlling the frontal air pressure on the resin as well as the towing speed of the pig, it becomes unnecessary to greatly reduce the towing speed, so that the filling can be made uniformly over the entire length of the pipe section while avoiding reduction in work efficiency, to enable performance of the repairing operation at high efficiency.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for repairing pipes laid underground in which the pipe is divided into sections of certain lengths, into which the resin and a pig for pushing it along the pipe section are inserted from the opening end so that gaps in numerous joints inside of the pipes are filled with the resin in the process of moving the resin by the drag of the pig, characterized by
   a pig, the work of which is to substitute the resin for substances such as air, provided on its periphery with filling channels of which the opening end opens onto the front of the pig's direction of motion, and escape channels opening onto the rear of the pig's direction of motion, the two channels being separated circumferentially but overlapping each other longitudinally against the direction of motion,
   the resin being supplied ahead of the pig, and an air supply means provided to supply a certain air pressure in the front of the pipe in the pig's direction of motion, so that
   in the process of pushing the resin by said pig, when the pig passes a pipe joint, the resin is forced into gaps in the pipe joint through the filling channels for the resin of said pig due to the frontal air pressure acting on the resin and the pressure in the resin caused by the movement of the resin itself, while the substance to be replaced among the sealing material and gaps in the joints is expelled to the rear of the pig's direction of motion through said escape channels, to ensure infiltration and saturation of the resin into the sealing material through gaps in the pipe joints whether or not the pipe joint has developed a leak.

2. A system for repairing pipes laid underground according to claim 1 wherein the process of pushing the resin by said pig is characterized by controlling filling pressure of the resin so as to obtain a uniform and proper filling action in the early stages at the divided section to be repaired when there is a large amount of resin ahead of the pig during the movement of the pig, causing a high pressure in the resin acting on the resin, due to viscous drag between the resin and pipe wall, and also in the mid and the later stages of the repairing operation, when the pressure in the later stages of the repairing operation, when the pressure in the resin is reduced due to less resin ahead of the pig as the operation progresses, in accordance with the change in the amount of resin.

3. A system for repairing pipes laid underground according to claim 2 wherein the passing speed of the pig being controlled, as means for controlling said filling pressure constant, in such a way,
   in the early stages of the repairing operation when there is a large amount of resin ahead of the pig, during the movement of the pig, causing a high pressure in the resin, the pig is towed at a higher speed, and
   in the later stages of the repairing operation when there is less resin ahead of the pig as the operation progresses, while the pig is moving, the passing speed of the pig is reduced in accordance with the resultant decline in pressure in the resin.

4. A system for repairing pipes laid underground according to claim 2 wherein the control of the air pressure, as means for controlling said filling pressure constant, is characterized in that,
   in the early stages of the repairing operation when there is a large amount of resin ahead of the pig, during the movement of the pig, causing the pressure in the resin to become higher, the frontal air pressure which is exerted on the resin from the front of the pig's direction of motion is reduced, and
   in the later stages of the repairing operation when there is less resin as the operation progresses, causing the pressure in the resin to become lower, the frontal air pressue which is exerted on the resin is increased in accordance with the resultant decline.

5. A system for repairing pipes laid underground according to claim 2 wherein both the frontal air pressure and the towing speed being controlled, as means for controlling said filling pressure constant, in such a way that, in the early stages of the repairing operation when there is a large amount of resin ahead of the pig during the movement of the pig, causing a high pressure in the resin, less frontal air pressure from the front of the pig's moving direction is exerted on the resin while the pig is towed at a higher speed, and in the later stages of the repairing operation when there is less resin ahead of the pig as the operation progresses, the frontal air pressure is increased and the passing speed of the pig is reduced in accordance with the resultant decline of the pressure in the resin.

* * * * *